US009143196B2

(12) United States Patent
Schwengler et al.

(10) Patent No.: US 9,143,196 B2
(45) Date of Patent: Sep. 22, 2015

(54) ENHANCED WIRELESS SIGNAL DISTRIBUTION USING IN-BUILDING WIRING

(71) Applicant: CenturyLink Intellectual Property LLC, Denver, CO (US)

(72) Inventors: Thomas Schwengler, Lakewood, CO (US); Michael L. Elford, Calhoun, LA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 216 days.

(21) Appl. No.: 13/676,293

(22) Filed: Nov. 14, 2012

(65) Prior Publication Data
US 2014/0134944 A1     May 15, 2014

(51) Int. Cl.
*H04B 3/52* (2006.01)
*H04W 16/20* (2009.01)

(52) U.S. Cl.
CPC . *H04B 3/52* (2013.01); *H04W 16/20* (2013.01)

(58) Field of Classification Search
CPC ......... H04B 3/52; H04W 16/20; H04W 84/12
USPC ...................................... 455/14–25; 370/315
See application file for complete search history.

(56) References Cited

U.S. PATENT DOCUMENTS

| 5,705,974 | A  | * | 1/1998  | Patel et al. ................. 307/104 |
| 5,832,364 | A  | * | 11/1998 | Gustafson .................... 455/14 |
| 6,167,278 | A  | * | 12/2000 | Nilssen ....................... 455/462 |
| 7,764,978 | B1 | * | 7/2010  | West .......................... 455/561 |
| 8,462,071 | B1 | * | 6/2013  | Rudish et al. ................ 343/810 |
| 8,600,315 | B2 | * | 12/2013 | Roufoogaran et al. ........ 455/78 |
| 2002/0058483 | A1 | * | 5/2002  | Shinichi et al. .............. 455/90 |
| 2005/0163309 | A1 | * | 7/2005  | Kim .......................... 379/413 |
| 2009/0008146 | A1 | * | 1/2009  | Oleske ....................... 174/350 |

OTHER PUBLICATIONS

The Art of UHF RFID Antenna Design: Impedance-Matching and Size-Reduction Techniques, Marrocco, IEEE Antennas and Propagation Magazine, vol. 50, No. 1, Feb. 2008.*

* cited by examiner

*Primary Examiner* — Raymond Dean
(74) *Attorney, Agent, or Firm* — Swanson & Bratschun, L.L.C.

(57) ABSTRACT

Methods and systems of distributing a radio frequency (RF) signal to a wireless device. The methods and systems include providing a RF transmitter having an antenna output, coupling a first end of an existing in-building wire network to the antenna output and transmitting a RF signal from the RF transmitter into the in-building wire network such that the in-building wire network operates as a waveguide. The methods and systems further include transmitting the RF signal from a second end of the in-building wire network to free air and receiving the RF signal with one or more wireless devices.

17 Claims, 6 Drawing Sheets

ENHANCED WIRELESS SIGNAL DISTRIBUTION USING IN-BUILDING WIRING

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to wireless communications, and in particular to radio frequency signal distribution through a home wired network.

BACKGROUND

The wireless distribution of broadband signals within a building is becoming commonplace. Wi-Fi is now the most common way people access the Internet. Smart phones compliant with 3G and 4G standards are commonly used inside buildings. Personal computers, laptop computers, cellular telephones, tablet computers, PDAs and other portable devices are typically configured to receive a wireless broadband signal. In addition, televisions, DVD players, Blu-ray disc players, smart thermostats, printers, copiers and many other digitally enabled home or business appliances are configured for wireless network access. To meet the needs of these and similar devices, many buildings now include a wireless access point (WAP), base station or repeater connected to a wired data or communication network to send and receive data or communication signals from the wired network to wireless devices within or near the building.

A typical WAP, base station or repeater includes a radio frequency (RF) transmitter. The transmitter is placed at a selected location within or near a building to provide wireless communications to wireless devices located throughout the building. For instance, a wireless router may be located in one room of a multi-level, multi-room building having several network devices scattered throughout the building.

One problem with the transmission of wireless broadband signals within a building is difficulty obtaining a sufficiently strong communication channel between the WAP or repeater and various receiving devices. For example, the exceptionally popular Wi-Fi standard defined in IEEE 802.11b is a low powered solution (less than 1 W) having a range of no more than 300 feet from the transmitter. The closer a receiving device is to the transmitter the better chance the receiver will have of connecting and typically the faster the Wi-Fi uplink/downlink performance will be. Connectivity and signal strength problems can be exacerbated by the walls, floors, ceilings and other surfaces or barriers present in a typical building which can cause signal attenuation and reflection.

Thus, some wireless devices located within range of a WAP or other transmitter may be properly connected to the wireless network while other wireless devices located farther away from the transmitter, but still within the building premises, may fall outside the wireless coverage zone or within a zone of marginal coverage. The range of a wireless network within a building can be extended with multiple access points or dedicated extenders. These solutions however, involve additional cost and additional cabling between access points.

Therefore, a simple and cost effective solution for extending wireless coverage is needed. The embodiments disclosed herein are intended to overcome one or more of the problems discussed above, and to provide related advantages.

BRIEF SUMMARY

One embodiment comprises a method of distributing a radio frequency (RF) signal to a wireless device. The method includes providing a RF transmitter having an antenna output, coupling a first end of an existing in-building wire network to the antenna output of the RF transmitter and transmitting a RF signal from the RF transmitter into the in-building wire network such that the in-building wire network operates as a waveguide. The method further includes transmitting the RF signal from a second end of the in-building wire network to free air and receiving the RF signal with one or more wireless devices.

The foregoing method may be implemented with any type of in-building wire network, including but not limited to a twisted pair telephone wire network, a power distribution network, a co-axial cable network and a data cable network. In these various embodiments, the second end of the in-building wire network may include at least one of a RJ11 telephone socket, a RJ45 data socket, a co-axial cable socket or a power outlet.

In some embodiments the impedance of the existing in-building wire network may be matched to the impedance of the antenna output of the RF transmitter. Alternatively, or additionally, a supplemental antenna may be coupled to the second end of the in-building wire network with or without an impedance matching element.

In an alternative embodiment the method may include the in-building wire network being a telephone cable and the supplemental antenna may be an antenna configured to be received in an RJ11 telephone socket in electrical communication with the telephone cable. The supplemental antenna in this embodiment may be a conventional telephone and/or telephone cable connected to the RJ11 socket.

In all embodiments, the RF signal may be, but is not limited to, at least one of an 802.11b, an 802.11a, an 802.11g, an 802.11n Wi-Fi signal, and an 802.11ac signal, and the RF transmitter may be, but is not limited to a wireless router.

An alternative embodiment is a radio frequency (RF) signal distribution system. The radio frequency (RF) signal distribution system includes a RF transmitter having an antenna output, an in-building wire network having at least one first end coupled to the antenna output of the RF transmitter such that the in-building wire network operates as a waveguide. In selected device embodiments, the in-building wire network also includes at least one second end providing for the propagation of the RF signal to free air. The system may further include at least one wireless device configured to receive the RF signal.

The in-building wire network of the system embodiments may be, but is not limited to, a twisted pair telephone wire network; a power distribution network; a co-axial cable network or a data cable network. The second end of the in-building wire network may be at least one of a RJ11 telephone socket, a RJ45 data socket, a co-axial cable socket and a power outlet. The system may further include a supplemental antenna coupled to the second end of the in-building wire network. The supplemental antenna may be of any type, including but not limited to a two wire dipole antenna, a four-wire double dipole antenna, a patch antenna or a device having antenna properties in addition to a primary function, such as a telephone and/or telephone cable.

System embodiments may further include a filter configured to filter the RF signal from portions of the existing in-building wire network to reduce noise in a native signal transmitted by the existing in-building wire network.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth should be understood as being modified in all instances by the term "about". In this application, the use of the singular includes the plural unless specifically stated otherwise, and use of the terms "and" and "or" means "and/or" unless otherwise indicated. Moreover, the use of the term "including", as well as other forms, such as "includes" and "included", should be considered non-exclusive. Also, terms such as "element" or "component" encompass both elements and components comprising one unit and elements and components that comprise more than one unit, unless specifically stated otherwise.

Figure 1:
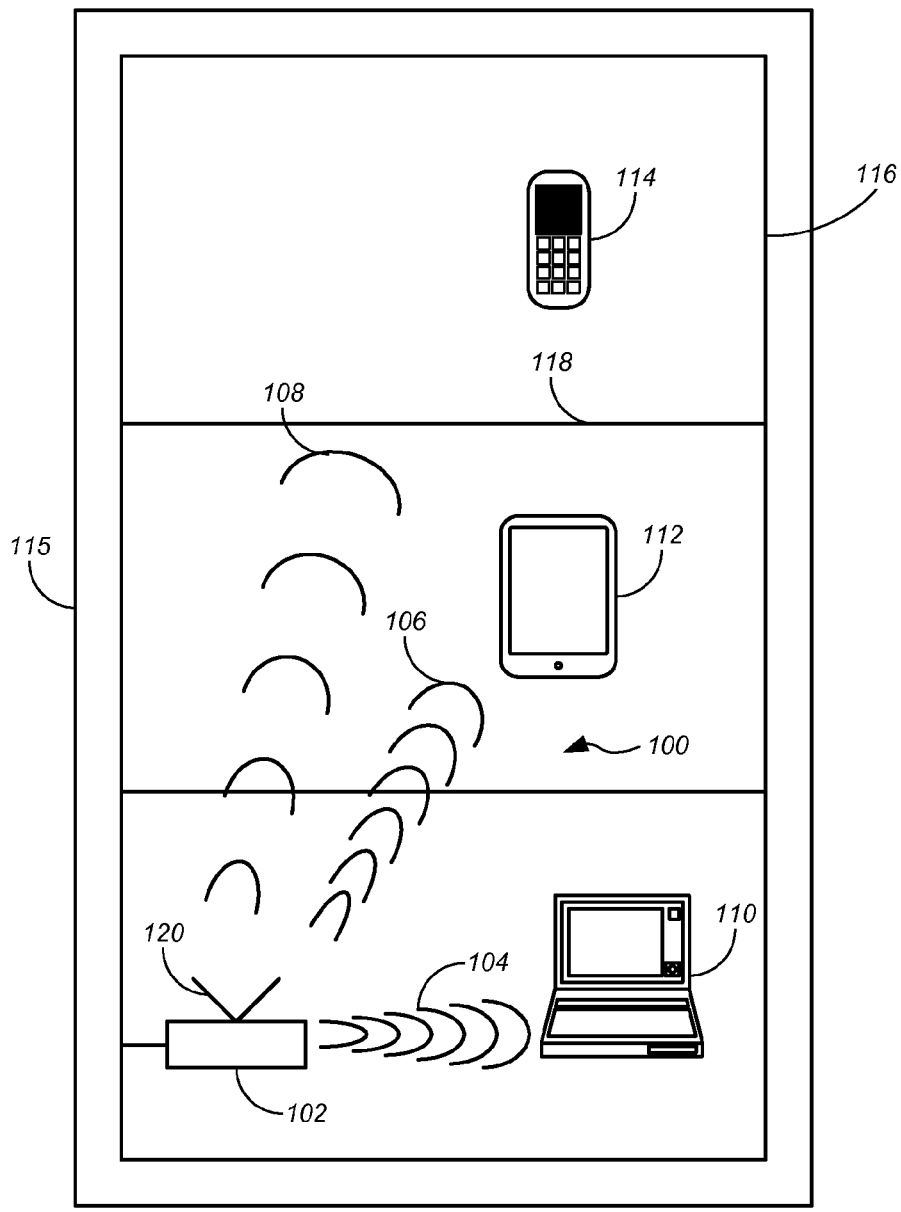
FIG. 1 is an illustration of a prior art wireless local area network (WLAN) with an access point configured to broadcast RF signals from one or more antennas to network devices.

FIG. 1 illustrates a wireless local area network (WLAN) 100 with an access point (AP) 102 including a transmitter configured to broadcast RF signals 104, 106, and 108 to communicate with network devices 110, 112, and 114, respectively. The WLAN 100 could be implemented with any type of AP 102 including but not limited to a home wireless network, a business wireless network, a femtocell or other wireless network suitable for use within a building 115 The AP 102 may transmit using any wireless standard. For example, the AP 102 may transmit a wireless signal according to the 802.11a/b/g/n, 802.11ac/ad, LTE, LTE Advanced, WiMAX 802.16d/e/m, DECT, or other standards.

The AP 102 may be implemented with any type of device having an RF transmitter. For example, the AP 102 may be implemented with a wireless router, a personal computer including a transmitter, a smart appliance including a transmitter or similar devices, a cellular telephone repeater or a cordless telephone base.

The wireless network devices 110, 112 and 114 could be any type of device configured to communicate with a wireless network including but not limited to a personal computer, laptop computer, tablet computer, smart phone, PDA, smart thermometer, television, video playing or recording device, smart appliance, alarm system, printer, copier, cordless phone, fax machine or any other device configured to receive wireless communications. It is important to note that the AP 102 is described herein is having a transmitter and the wireless devices are described herein as having a receiver. This nomenclature is used merely to simplify the description of the various embodiments. All types of AP will include electronic circuitry enabling the AP to transmit and receive data or communication signals. In addition all types of wireless network devices will include electronic circuitry enabling the device to transmit and receive data or communication signals. Typically the AP and device will engage in both uplink and downlink transmissions although the signal type and signal characteristics for uplink and downlink transmissions need not be the same.

The AP 102 may be located in one room, space or location within or near a building 115. As noted above, a typical building will be divided into separate rooms, regions, levels and floors by walls 116, floors 118, ceilings and other partitions customarily used to define interior spaces. Walls, floors and other partitions can cause problems with signal transmission. For example, the RF signals 104, 106 broadcast from the one or more antennas 120 normally associated with the AP 102 are illustrated in FIG. 1 as having been successfully propagated to wireless network devices 110, 112 respectively. On the contrary, RF signal 108 is illustrated as being attenuated by passage through multiple floors 118 and/or walls 116 and thus fails to reach network device 114 with sufficient strength for two-way communication. Attenuation may also occur due to signal fading over distance.

Figure 2:
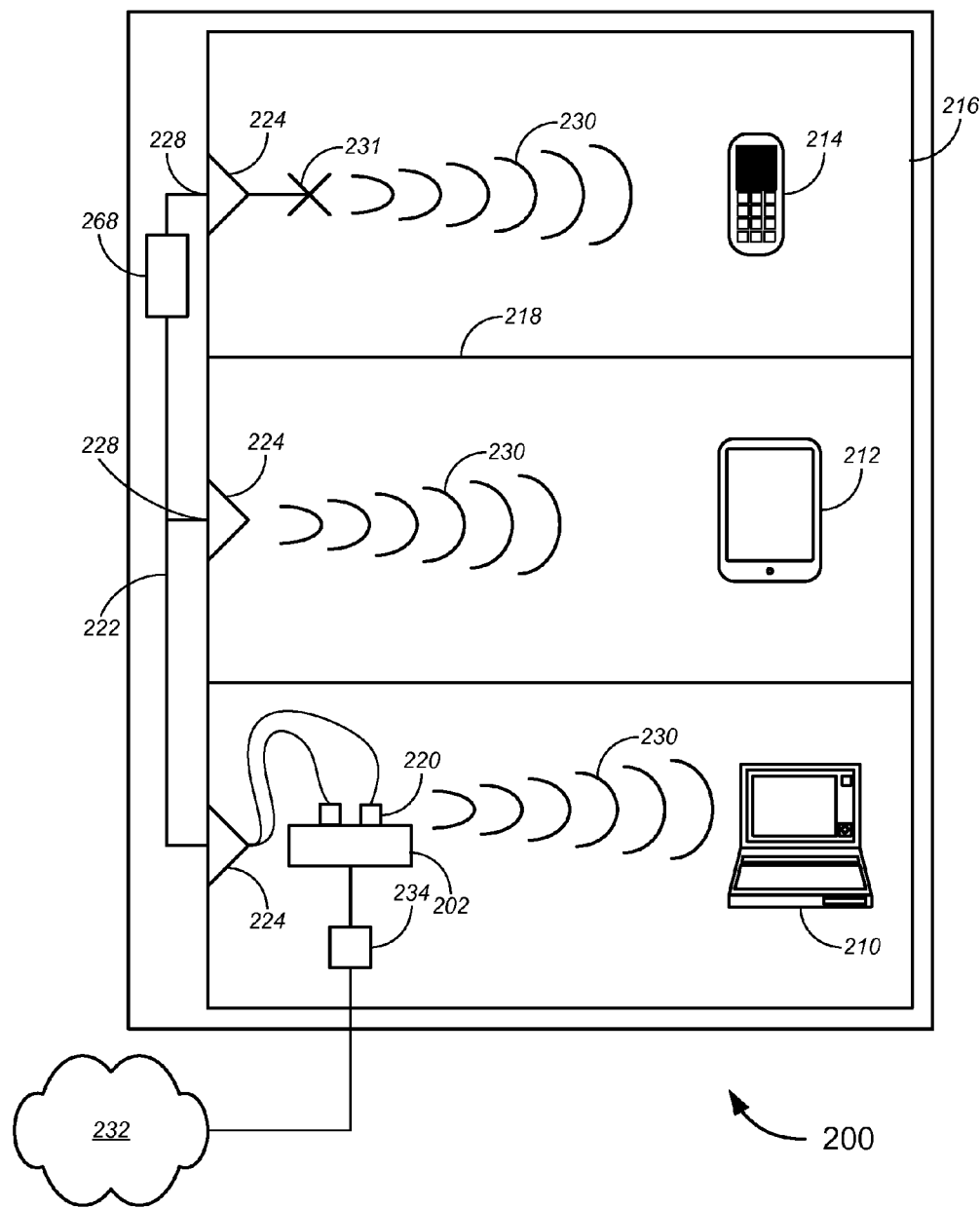
FIG. 2 is an illustration of an exemplary WLAN featuring the use of an in-building wire network as a waveguide according to present embodiments.
Figure 3:
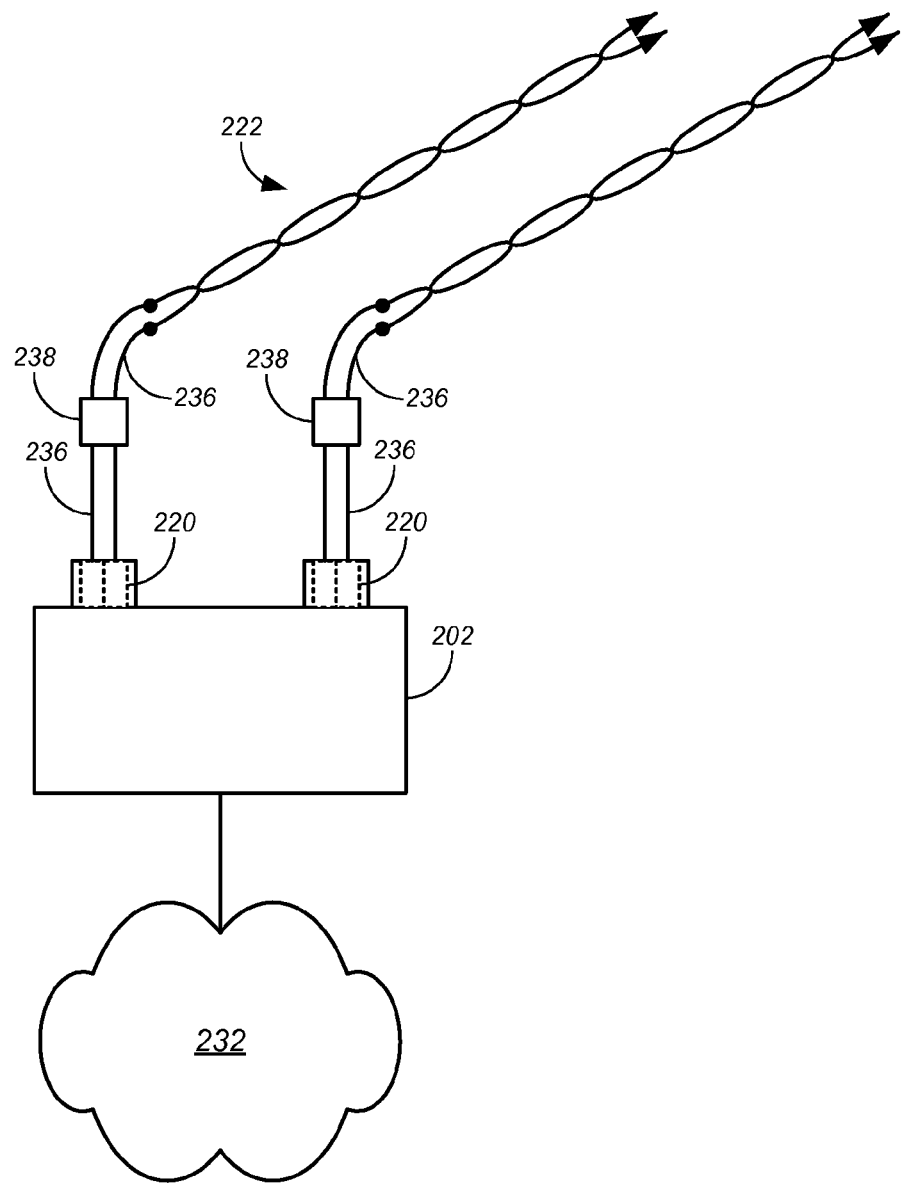
FIG. 3 is a schematic diagram of an AP and first end of an in-building wire network according to present embodiments.

FIG. 2 shows an exemplary WLAN 200 according to present embodiments that mitigates RF signal loss due to fading and/or attenuation by walls 216, floors 218, ceilings or other causes. The AP 202 includes antenna outputs 220. FIG. 3 is a more detailed view of the AP 202 including antenna outputs to 220 and associated elements. The embodiments disclosed herein feature the use of the antenna outputs 220 to connect the AP transmitter directly or indirectly with a wire, cable or other conductor associated with an existing in-building wire network 222. The in-building wire network 222 may be any existing wire, wire system, wire network or distributed set of wires or cables which is found within or associated with a building. For example, an in-building wire network 222 may be an existing twisted-pair telephone wire network running through the floors, walls and ceilings of the building and connecting POTS telephone service to land-line telephones or other devices distributed throughout the building. A twisted-pair telephone wire network typically terminates in several RJ11 or other type of telephone jack distributed throughout the building. Alternatively, the existing in-building wire network could be a coaxial cable network, a two or three wire power distribution network, or any type of data cable network including but not limited to a CAT 5 or CAT 6 data cable network or a similar network of wires distributed throughout a building.

Each type of in-building wire network will typically have terminations or sockets accessible in the walls, floors or ceilings of the building. The terminations or sockets are generally specific to the type of wire network, for example a CAT 5 or CAT 6 Ethernet data cable network will typically terminate in multiple RJ45 sockets spread throughout the building. A coaxial cable network will terminate in one or more coaxial cable jacks; and a power distribution network will terminate in multiple power outlets distributed throughout the building. As described in detail below, each type of existing in-building wire network will often carry a native communication, data, entertainment or power signal which is unrelated to the RF signal being coupled to the in-building wire network in the disclosed embodiments. For example, the twisted pairs connecting various telephone jacks within a building are configured to carry analog telephone signals. Similarly a data network is configured to carry digital data signals and a power distribution network is configured to carry AC power.

As shown in FIGS. 2 and 3, the antenna outputs 220 of the AP 202 are connected to an existing in-building wire network 222. If necessary, any native antenna elements may be removed from the AP 202 prior to connecting the antenna outputs to an existing in-building wire network 222. Any required connection between the antenna outputs 220 and the in-building wire network 222 may optionally be made through an outlet, socket, jack or other termination 224 associated with the in-building wire network 222.

Once connected, the AP 202 may transmit RF signals to and through the in-building wire network 222. The in-building wire network 222 thus serves as a metal waveguide channeling the propagating RF signals. The RF signals propagate within the in-building wire network waveguide until the signals reach a termination, in particular one or more second ends 228 of the in-building wire network 222 distributed throughout the building. A second end 228 of an in-building wire network 222 is defined herein as any portion of the in-building wire network 222 which is distal to the antenna outputs 220 and from which RF signals may be transmitted to free air. Thus, a second end 228 of the in-building wire network 222 is often a termination socket or junction associated with the in-building wire network 222. This configuration is not limiting however, as a second end 228 could be any portion of in-building wire located away from the antenna outputs 220.

With respect to FIG. 2 the illustrated second ends 228 are shown as outlets or sockets 224. In one embodiment, each outlet, jack, socket or other second end 228 operates as a small antenna to emit the RF signals 230 into free air. The RF signals 230 have in certain instances traveled some distance within the in-building wire network before emission from a second end 228. Thus, the emitted RF signal 230 may successfully reach and connect with a wireless network device positioned beyond the range of the AP 202 broadcasting RF signals in the conventional manner from a native antenna, for example antenna 120 of FIG. 1.

Wireless network devices 210, 212, 214 typically broadcast uplink RF signals that are received at a second end 228 of an in-house wire network. These uplink signals also travel through the in-building wire network 222 to the AP 202. In some embodiments, as described in detail below, a supplemental antenna 231 may be provided at one or more second ends 228 for improved transmission and reception of RF signals.

As noted above, each second end 228 may exhibit the properties of a small antenna. For instance, the second end 228 may be an RJ11 wall jack which includes an array of short conducting elements that together act as a short stub antenna.

Still referring to FIG. 2, the AP 202 may also be connected to a local computer or a data or communications network 232 such as a WAN, a LAN, a telecommunications network, the internet or another network. The connection between AP 202 and an exterior network may include any number of intermediate cables or devices. For instance, the AP 202 may be connected to both the Internet and a telecommunications network through a DSL modem 234 connected to a public telephone network. In other embodiments, the AP 202 may be connected through a cable modem to the Internet and a cable television/communications network. In other embodiments, the AP 202 may include an Ethernet connection to an internal or external network through a data cable and RJ45 outlet. Thus, the AP 202 may be connected to any type of computer, internal network or external network by any known means.

An AP 202 configured to connect to a first end of an in-building wire network 222 is shown in FIG. 3. In the FIG. 3 embodiment, the in-building wire network 222 is illustrated as a twisted pair telephone cable network which interconnects telephone jacks distributed throughout the building. The AP 202 is implemented with a Wi-Fi router having one or more antenna outputs 220 which are typically implemented as coaxial connectors. The native antennas may be detached from the AP so that the antenna outputs 220 can be coupled directly to the in-house wire network 222. It may be necessary to use a suitable intermediate cable 236 to extend the antenna outputs 222 to the in-house wire network 222.

It may be desirable to match the impedance of the antenna outputs 220 to the in-house wire network 222. In one embodiment, a balun system 238 is connected between the antenna outputs 220 and the in-house wire network 222. A balun 238 is a device that interfaces between the electrically BALanced feed of the twisted pair and the electrically UNbalanced feed of the coaxial antenna output 220, thereby resolving mismatched impedances. For example, the impedances present in the system illustrated in FIG. 3 are typically 100 Ohm for the twisted pairs 222 and 50-75 Ohm for the coaxial antenna outputs 220. Other methods of impedance matching may be utilized to minimize impedance mismatch between the antenna output of the AP and the in-house wire network.

Alternative configurations for connecting a twisted pair to one or more coaxial antenna outputs 220 may not include the balun system 238 of FIG. 3. For example, the center conductor of one coaxial antenna output 220 may be directly connected to one wire of a twisted pair and the shield may be connected directly to the second wire of the same twisted pair. Alternatively, two center conductors of two coaxial antenna outputs 222 may be connected to the two wires of a first twisted pair and the shields of the coaxial antenna outputs 222 may be directly connected to the two wires of a second twisted pair.

Alternatively, the in-building wire network 222 may be a cable television coaxial cable network. In a coaxial cable embodiment, one or more RF antenna outputs, for example, one from each of the two coaxial antenna outputs 220 on the AP 202 may, if necessary, be combined for transmission through a single cable. For instance, an RF diplexer may be attached to both coaxial antenna outputs and a coaxial patch cable connected to a coaxial outlet communicating with the in-building wire network. Similar connections with or without impedance matching can be made for any type of in-building wire network.

Figure 4:
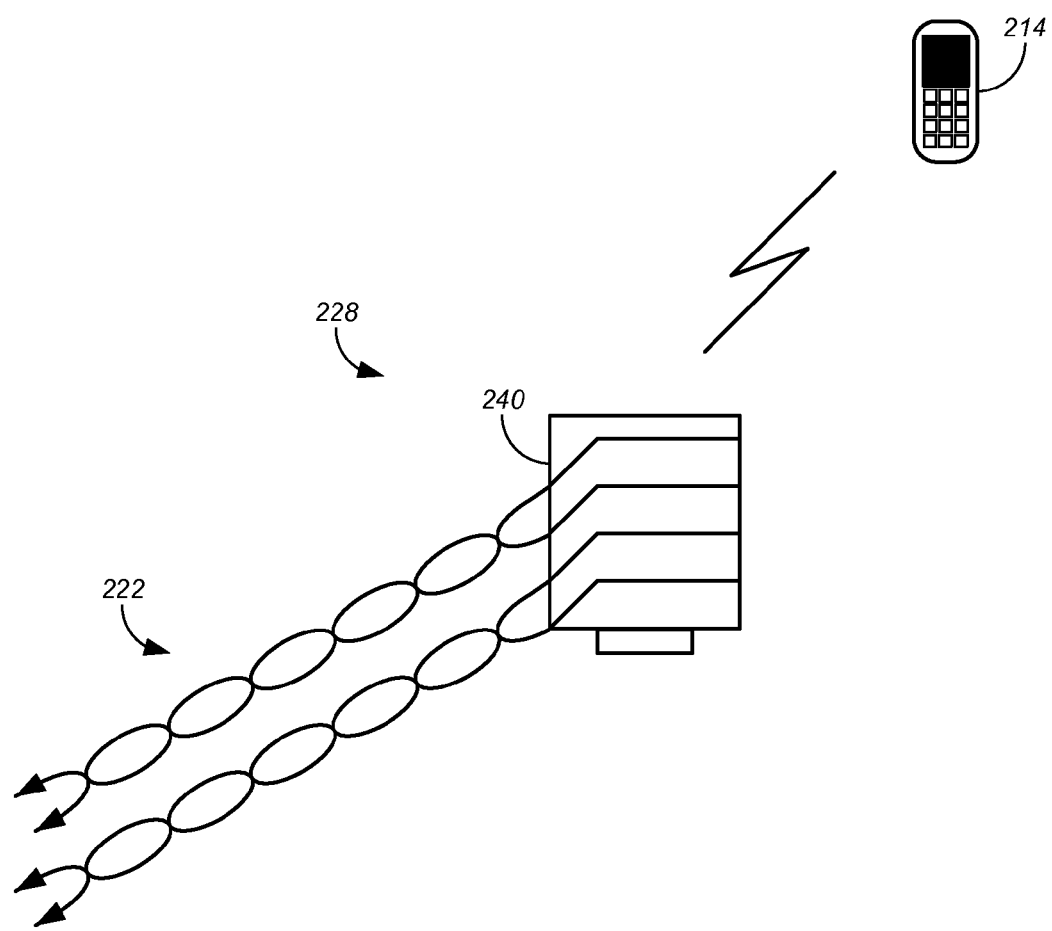
FIG. 4 is a schematic diagram of a second end of an in-building wire network according to present embodiments.

FIG. 4 is a schematic illustration of the distal, second end 228, portion of the in-building wire network 222 described with respect to FIG. 2. In particular, FIG. 4 shows a portion of the in-building wiring 222 terminating at a second end 228 which is implemented with a telephone jack 240. As noted above the telephone jack 240 or other outlet may function as a short-stub antenna. Thus, the jack 240 may broadcast and receive RF signals to a wireless network device 214 configured to receive wireless signals. Alternatively, as shown in FIG. 2 a supplemental, antenna 231 may be connected to the jack 240 to enhance transmission of the RF signal.

Figure 5A:
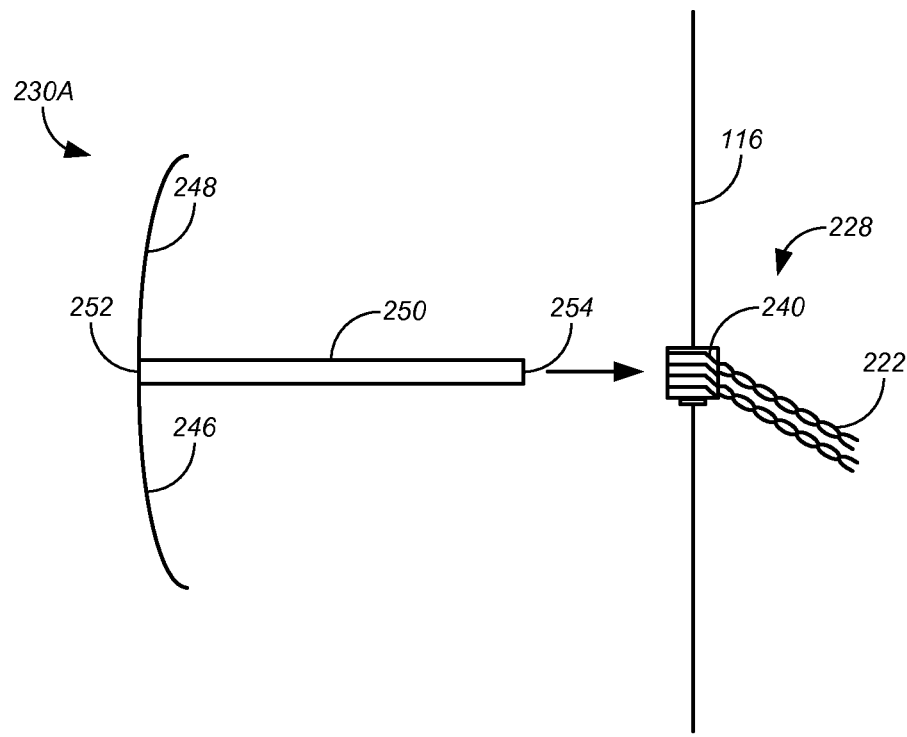
FIGS. 5A and 5B are illustrations of representative supplemental antennas.
Figure 5B:
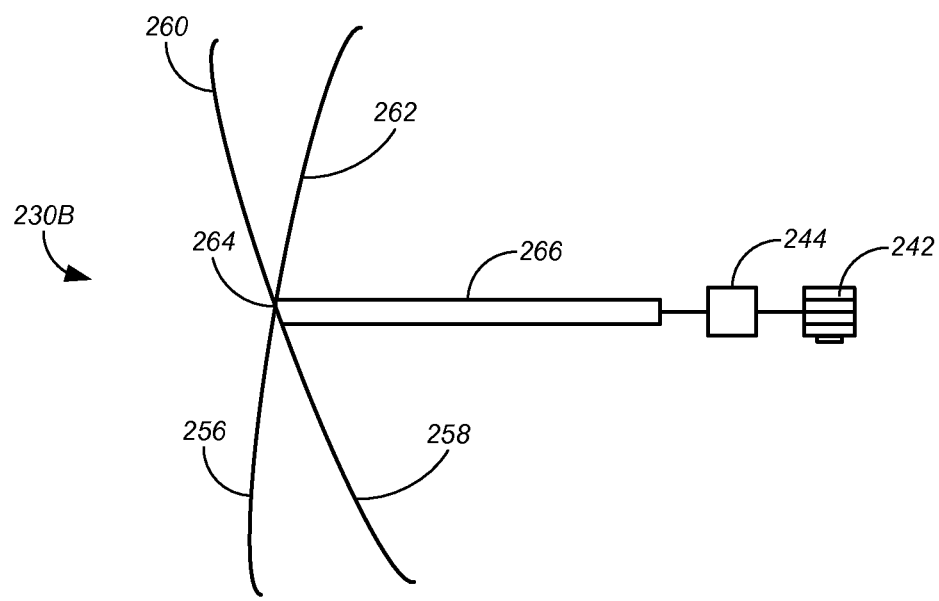

For example, as shown in FIGS. 5A and 5B, a supplemental antenna 230 may be configured to be coupled to a second end 228 of the in-building wire network. As shown in FIG. 5A, the supplemental antenna 230 may be connected to the in-building wire network directly, or as shown in FIG. 5B the supplemental antenna 230 may be coupled to a plug 242 configured to couple to a jack, socket or outlet in electrical communication with the in-building wire network. The supplemental antenna 230 may further be matched to the impedance of the in-building wire network with an impedance matching element 244. A suitable impedance matching element may be implemented with a balun such as described above or an alternative system.

In some embodiments, impedance may be successfully matched through appropriate design of the radiating elements of the supplemental antenna 230. For instance, antenna radiation resistance "R" is a function of the length "l" of antenna elements according to the following: $R=80\pi^2(l/\lambda)^2$, wherein $\lambda$ represents one wavelength. Therefore, an antenna well matched to a 50 Ohm in-building wire network requires antenna elements of length $l=\lambda/4$. An antenna with element lengths of $l=\lambda/2$ matches well a typical coaxial network used for TV signal distribution with 75 Ohm impedance. A telephony network of in-building telephone wires usually has an impedance of 100 Ohm for frequencies above a few MHz, for which a well matching antenna elements have a length of $l=0.36\lambda$. It is important to note however that a supplemental antenna 230 may have elements of any length or configuration. Finally antenna matching stubs can be used to match any type of antenna elements to the in-building wiring impedance.

FIGS. 5A and 5B depict two possible non-limiting configurations of supplemental antennas. FIG. 5A shows a dipole antenna 230A comprising two radiator wires 246, 248 attached to a feeder 250 at a feed point 252. The remaining end of the feeder 250 comprises a plug 254 configured to be received in an RJ11, RJ45, coaxial cable outlet, power outlet, or various other outlets connected to the in-building wiring system 222. The antenna wires 246, 248 may be oriented in any direction to optimize the intensity of radiation or to achieve desired radiation patterns. The feed point 252 may be located off-center with respect to the total length of the radiator wires 246, 248, such that radiator wires 246, 248 may have differing length. Optimal feed impedance can be achieved as known in the art.

The radiator wires 246, 248 may be straight, curved or of any other desired shape or orientation, and can be composed of any conductive material, for example highly conductive copper or aluminum. In some embodiments, the radiator wires 246, 248 are hollow tubes of conductive material.

FIG. 5B depicts a turnstile antenna 230B comprising a four-wire double-dipole antenna with dual polarization. Four radiator wires 256, 258, 260, 262 are attached to feed point 264 and feeder 266. The radiator wires are configured to transmit and receive RF signals for communication to the in-building wire network 222. In one embodiment, the four radiator wires 256, 258, 260, 262 are each attached to one wire of two twisted pairs of an in-building telephone cable. In another embodiment, the four radiator wires 256, 258, 260, 262 may be connected to one or more connectors of the four pairs of wires in an Ethernet CAT5 or CAT6 data cable.

Antenna 230B includes an alternative impedance matching device 244 positioned in electrical communication with the feeder 266 and a plug 242 configured to conveniently attach to a socket or jack associated with the in-building wire network 222. It is important to note that many alternative antenna designs may be suitable for use as a supplemental antenna 230 including but not limited to a patch antenna or other antennas having various polarization configurations. Patch antenna elements can be of various shapes, including but not limited to rectangular, circular, or other shapes. Patch antennae may be implemented on a dielectric or in the air; and patches may be connected to the in-building wire network any combination of suitable wires, lines or feeder elements.

In another alternative embodiment, certain items or appliances which can be conveniently connected to a second end 238 of an in-building wire network 222 may be installed and used as a functional supplemental antenna 230. For example, a telephone and telephone cord may be connected to a RJ11 socket at a second and 228 of an in-building wire network 222 to specifically function as a supplemental antenna. In this example, the terminating device is not necessarily well impedance matched at RF frequencies, thus causing some standing wave pattern in the telephone cord. Nonetheless an appliance such as a telephone and cord has been shown to act as a practical antenna.

As noted above, a typical in-building wire network 222 will be configured to convey a native signal. For example telephone wiring is configured to convey analog telephone signals. Similarly, power wiring is configured to convey AC power and data cabling is configured to convey data. It can be important to avoid interference with the native signal present in an in-building wire network when coupling RF wireless signals to the wire network as described herein. Thus, in selected embodiments, as shown in FIG. 2, one or more filters 268 may be incorporated into the system at any point to reduce any audible noise on the in-building wire network. In some embodiments, notch filters may be utilized to limit impact of the present system on native signals communicated through the in-building wire network. Filter devices are well known and widely used for use with ADSL, VDSL, or DOCSIS; for ADSL or VDSL for instance, the lack of filters causes some audible interference to most telephone systems. Simple low-band filters remove that audible interference. In the disclosed embodiments, a similar filter may be required as the RF signal may cause interference with other standard signals otherwise present on the network; these standards use well-defined band plans, and filters can be designed to work with these band plans. VDSL, VDSL2, ADSL, ADSL2+ band plans work below 30 MHz, and it is therefore relatively easy to remove interference with a simple low-band filter of the order of 40 MHz. Other technologies such as HPNA, MoCA also use different bands of spectrum for in-home delivery of content, many of which can be filtered by a low-band filter below the RF frequency as described above, or by a notch filter.

Figure 6:
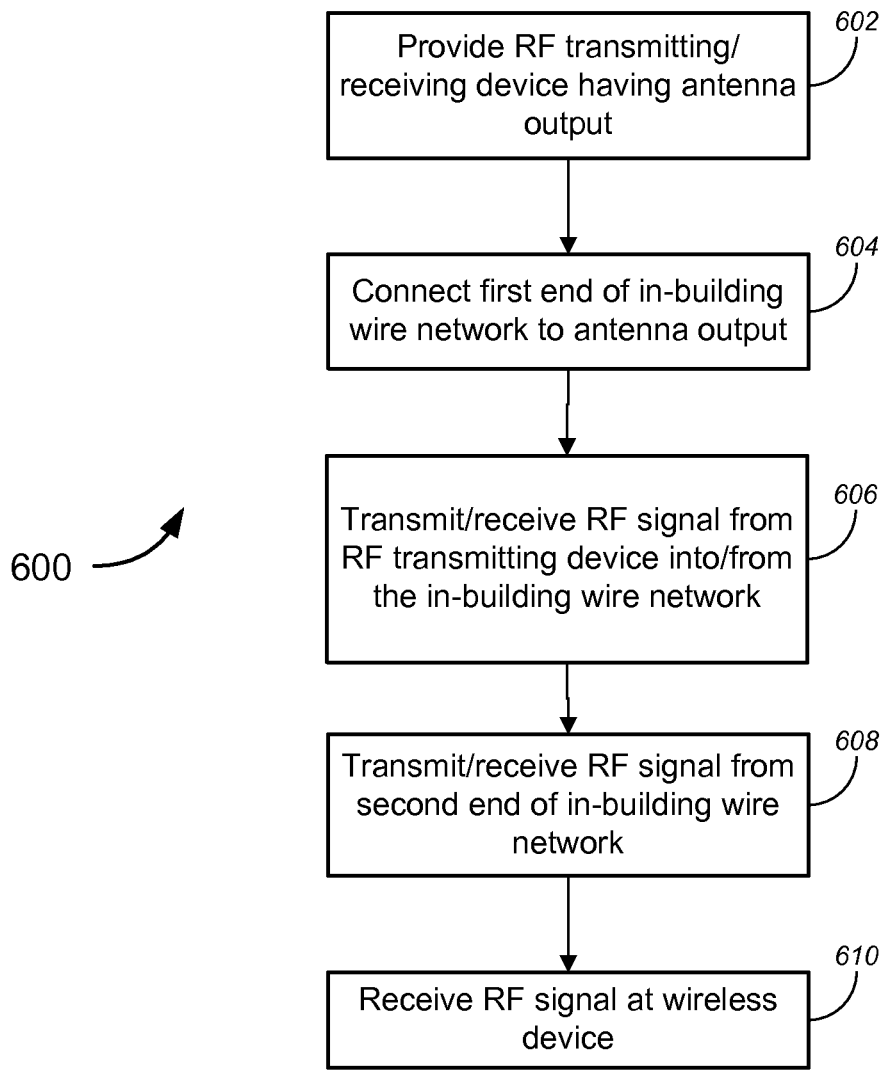
FIG. 6 is a flowchart for an exemplary method of RF signal distribution through in-building wiring according to present embodiments.

FIG. 6 is a flowchart representation of an exemplary method 600 as disclosed herein. The method begins at step 602 by providing an RF transmitting device having an antenna output. At step 604, a first end of an existing in-building wire network is connected to the antenna output of the RF transmitting device. At step 606, a selected RF signal is transmitted from the RF transmitting device into the in-building wire network, such that the in-building wire network operates as a waveguide. At Step 608 the RF signal is transmitted from a second end of the in-building wire network, possibly through a supplemental antenna or device operating as a supplemental antenna, to free air. At step 610, the RF signal is received by a wireless network device. Additional steps may optionally be included in the method. For example, uplink RF signals may be received from the wireless device with the in-building wire network. Thus, the devices in the transmission chain the RF transmitting device to wireless devices communicate in both direction by reciprocity theorem, a fundamental theorem of radio propagation. In addition, the method may include providing an optional supplemental antenna and filtering any noise which might interfere with the native signal carried by the in-building wire network.

As noted above, a telephone and telephone cord may be connected to the second end of a suitable in-building wire network, for example through an RJ11 socket this or other appliances operating as an unconventional antenna have been shown to improve the strength of a signal transmitted to a wireless network device. In particular, experimental studies have shown that significant improvement (up to 5.0 dB) in signal strength can be measured near telephones plugged into RJ11 telephone outlets when a RF signal is coupled to the in-building wire network.

Furthermore, a telephone cord plugged into an RJ11 outlet may improve signal strength by up to 10 dB, when compared to an empty telephone outlet operating as a stub antenna. Thus, the telephone cord may extend the waveguide properties of the in-building wire network and may further operate as a supplementary antenna. Experiments further show that a small four-wire double-dipole antenna, as described in FIG. 5B, can improve signal strength in a room by 4.0 dB. A summary of selected measured signal strengths is shown in Table 1 below.

TABLE 1

Received signal strength in dBm over
a 20 MHz 802.11n physical layer.

| | Measured received signal strength (dBm) | |
|---|---|---|
| | Over the air | AP connected to home telephony wiring per invention |
| Different locations within the home near phones | −68 | −72 |
| | −60 | −70 |
| | −71 | −82 |
| | −58 | −62 |
| | −62 | −71 |
| Different locations within the home, with no phone in the room | −63 | −51 |
| | −61 | −56 |
| | −72 | −74 |
| Improvement near phones | | 5.0 |
| No phones nearby | | −7.6 |
| Overall | | −2.9 |

The data tabulated in Table 1 shows that significant improvements (5.0 dB) are measured near phones when the AP is connected to the telephony network. The table also shows that signal strength is weaker where the wired network is not present. In addition, it may be noted that the overall propagation is somewhat degraded as the AP signal is guided towards the wired network, rather than allowed to propagate in all rooms.

As also shown in Table 1, the experiments demonstrate that a telephone and phone wire plugged into a socket causes a substantial improvement and actually improves signal in the room with the telephone room by up to 10 dB compared to the socket itself, which is a relatively poor antenna. Furthermore, a small 4-wire double-dipole antenna (as described in FIG. 5B improves signal in a room near the socket by 4.0 dB, which is better than just a socket, but not as good as a phone cord connected to a phone in the room.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of distributing a radio frequency (RF) signal to a wireless device comprising:
    providing a RF transmitter having an antenna output;
    coupling a first end of an existing in-building wire network to the antenna output of the RF transmitter;
    transmitting a RF signal from the RF transmitter into the in-building wire network such that the in-building wire network operates as a waveguide;
    coupling a removable supplemental antenna to a second end of the in-building wire network, wherein the removable supplemental antenna is impedance matched to an impedance of the in-building wire network without the use of a separate impedance matching element;

transmitting the RF signal from the removable supplemental antenna to free air without passing the RF signal through a second active RF transmitting device at the second end of the in-building wire network; and receiving the RF signal with the wireless device.

2. The method of claim 1 wherein the in-building wire network comprises at least one of a twisted pair telephone wire network; a power distribution network; a co-axial cable network and a data cable network.

3. The method of claim 1 further comprising matching the impedance of the existing in-building wire network to the impedance of the antenna output of the RF transmitter.

4. The method of claim 1 wherein the second end of the in-building wire network comprises at least one of a RJ11 telephone socket, a RJ45 data socket, a co-axial cable socket and a power outlet.

5. The method of claim 1 wherein the second end of the in-building wire network comprises a RJ11 telephone socket and the removable supplemental antenna comprises a telephone and telephone cord connected to the RJ11 socket.

6. The method of claim 1 wherein the in-building wire network comprises a telephone cable having at least two twisted pair wire elements, wherein the second end of the in-building wire network comprises a RJ11 telephone socket, and wherein the supplemental antenna comprises an antenna configured to be received in the RJ 11 telephone socket in electrical communication with the telephone cable.

7. The method of claim 1 further comprising filtering the RF signal from portions of the existing in-building wire network to reduce noise in a native signal transmitted.

8. The method of claim 1 wherein the RF signal is at least one of an 802.11b, an 802.11a, an 802.11g, an 802.11n Wi-Fi signal, and an 802.11ac signal, and the RF transmitter is a wireless router.

9. A radio frequency (RF) signal distribution system comprising:

a RF transmitter having an antenna output;

an in-building wire network having at least one first end coupled to the antenna output of the RF transmitter such that the in-building wire network operates as a waveguide, the in-building wire network further having at least one second end;

a removable supplemental antenna coupled to the at least one second end of the in-building wire network providing for transmission of the RF signal to free air from the removable supplemental antenna without passing the RF signal through a second active RF transmitting device at the second end of the in-building wire network, wherein the removable supplemental antenna is impedance matched to an impedance of the in-building wire network without the use of a separate impedance matching element; and a wireless device configured to receive the RF signal.

10. The system of claim 9 wherein the in-building wire network comprises at least one of a twisted pair telephone wire network; a power distribution network; a co-axial cable network and a data cable network.

11. The system of claim 9 wherein the impedance of the existing in-building wire network is matched to the impedance of the antenna output of the RF transmitter.

12. The system of claim 9 wherein the second end of the in-building wire network comprises at least one of a RJ11 telephone socket, a RJ45 data socket, a co-axial cable socket and a power outlet.

13. The system of claim 9 wherein the second end of the in-building wire network comprises a RJ11 telephone socket and the removable supplemental antenna comprises a telephone and telephone cord connected to the RJ11 socket.

14. The system of claim 9 wherein the in-building wire network comprises a telephone cable having at least two twisted pair wire elements, wherein the second end of the in-building wire network comprises a RJ11 telephone socket, and wherein the supplemental antenna comprises an antenna configured to be received in the RJ11 telephone socket in electrical communication with the telephone cable.

15. The system of claim 9 further comprising a filter configured to filter the RF signal from portions of the existing in-building wire network to reduce noise in a native signal transmitted by the existing in-building wire network.

16. The system of claim 9 wherein the RF signal is at least one of an 802.11b, an 802.11a, an 802.11g, an 802.11n and an 802.11ac Wi-Fi signal, and the RF transmitter is a wireless router.

17. The system of claim 13, wherein the supplemental antenna comprises a four-wire double dipole antenna.

* * * * *